(12) United States Patent
Yokoshima et al.

(10) Patent No.: US 12,465,307 B2
(45) Date of Patent: Nov. 11, 2025

(54) X-RAY IMAGING DEVICE

(71) Applicants: FUJIKIN SOFT CO., LTD., Osaka (JP); T & S CORPORATION, Chiba (JP)

(72) Inventors: Shin Yokoshima, Chiba (JP); Youji Nikaido, Chiba (JP); Akira Mizoo, Osaka (JP); Masashi Kishi, Osaka (JP); Tadashi Uwai, Osaka (JP)

(73) Assignees: FUJIKIN SOFT CO., LTD., Osaka (JP); T & S Corporation, Chiba (JP)

( * ) Notice: Subject to any disclaimer, the term of this patent is extended or adjusted under 35 U.S.C. 154(b) by 265 days.

(21) Appl. No.: 18/247,689

(22) PCT Filed: Jul. 12, 2021

(86) PCT No.: PCT/JP2021/026115
§ 371 (c)(1),
(2) Date: Apr. 3, 2023

(87) PCT Pub. No.: WO2022/074889
PCT Pub. Date: Apr. 14, 2022

(65) Prior Publication Data
US 2023/0404500 A1 Dec. 21, 2023

(30) Foreign Application Priority Data
Oct. 6, 2020 (JP) .................. 2020-168841

(51) Int. Cl.
*A61B 6/00* (2024.01)
*A61B 6/04* (2006.01)
*A61B 6/50* (2024.01)

(52) U.S. Cl.
CPC .............. *A61B 6/4441* (2013.01); *A61B 6/04* (2013.01); *A61B 6/4452* (2013.01); *A61B 6/50* (2013.01)

(58) Field of Classification Search
CPC ................................................ A61B 6/4441
See application file for complete search history.

(56) References Cited

U.S. PATENT DOCUMENTS 8,005,186 B2  8/2011  Lee et al.
9,384,545 B2  7/2016  Uehara et al.
(Continued)

FOREIGN PATENT DOCUMENTS

CN     109730710 A      5/2019
JP     2005-253789 A    9/2005
(Continued)

OTHER PUBLICATIONS

Mamada et al., JP 2008-000347 A and its English translation (Year: 2008).*

(Continued)

*Primary Examiner* — Chih-Cheng Kao
(74) *Attorney, Agent, or Firm* — WCF IP (57) ABSTRACT

X-ray images from multiple angles are acquired with a simple configuration.

An X-ray imaging device 1 includes an X-ray generation unit 17*a*, an X-ray detection unit 17*b* facing the X-ray generation unit with a space therebetween, a support portion 13 that supports the X-ray generation unit and the X-ray detection unit, a strut 10 that stands upright from a placement face and holds the support portion, and a coupling portion 14 that turnably couples the support portion to the strut. The support portion may be bent so that both ends face each other, the X-ray generation unit and the X-ray detection unit may be disposed at both ends, and the coupling portion may rotate about a direction along both ends.

9 Claims, 9 Drawing Sheets

(56) References Cited

U.S. PATENT DOCUMENTS

| | | | |
|---|---|---|---|
| 2002/0045817 A1* | 4/2002 | Ichihashi | A61B 6/589 |
| | | | 378/42 |
| 2005/0222560 A1 | 10/2005 | Kimura et al. | |
| 2015/0150466 A1* | 6/2015 | Abi-Jaoudeh | A61B 5/4839 |
| | | | 600/427 |
| 2015/0374319 A1* | 12/2015 | Claus | A61B 6/032 |
| | | | 378/15 |
| 2016/0007949 A1* | 1/2016 | Kobayashi | A61B 6/54 |
| | | | 378/42 |
| 2016/0345916 A1 | 12/2016 | Lim et al. | |
| 2018/0263588 A1 | 9/2018 | Fujiwara | |
| 2018/0351345 A1 | 12/2018 | Matsumoto et al. | |
| 2019/0336090 A1 | 11/2019 | Kopp | |
| 2021/0219927 A1* | 7/2021 | Dencovski | A61B 6/4441 |

FOREIGN PATENT DOCUMENTS

| | | |
|---|---|---|
| JP | 2010-503510 A | 2/2010 |
| JP | 2013-111227 A | 6/2013 |
| JP | 2015-043894 A | 3/2015 |
| JP | 2018-153297 A | 10/2018 |

OTHER PUBLICATIONS

Ceyhan et al., DE 102006055165 A1 with English translation (Year: 2008).*

Korean office action dated Jan. 28, 2025.

* cited by examiner

X-RAY IMAGING DEVICE

TECHNICAL FIELD

The present invention relates to an X-ray imaging device.

BACKGROUND ART

A device that irradiates a human body with an X-ray and acquires an X-ray image is known.

Patent Literature 1 describes a radiation image acquisition device for observing tomographic image data as a moving image. Patent Literature 2 describes an X-ray image diagnosis device that generates a composite image by combining a captured X-ray image of a region of interest and an X-ray image of a peripheral region. Patent Literature 3 discloses an X-ray moving image analysis device that generates an X-ray moving image related to a bone shadow and an X-ray moving image related to a soft tissue based on a first frame including a bone shadow/shade image and a second frame including a soft tissue image. Patent Literature 4 describes an X-ray moving image processing device that estimates an amount of movement of a body and performs image conversion to suppress an influence of movement of the body using the amount of movement.

CITATION LIST

Patent Literature

Patent Literature 1: JP 2005-253788 A
Patent Literature 2: JP 2013-111227 A
Patent Literature 3: JP 2015-043894 A
Patent Literature 4: JP 2018-153297 A

SUMMARY OF INVENTION

Technical Problem

In recent years, the novel coronavirus has prevailed worldwide, and there is a need for a device capable of appropriately diagnosing pneumonia caused by the novel coronavirus. Ground glass shadows (interstitial shadows) generated by the novel coronavirus are lighter in shade than infiltrated shadows of general bacterial pneumonia, and it may be difficult to distinguish them in simple photographs. In addition, when there is a basal disease such as emphysema, it is still more difficult to distinguish. Pneumonia caused by the novel coronavirus also occurs around the diaphragm, the outer edge portion of the lung, and the like. Therefore, it is difficult to accurately carry out a diagnosis unless the lung is observed from multiple angles.

An object of the present invention is to acquire an X-ray image from multiple angles with a simple configuration.

Solution to Problem

In order to achieve the above object, an X-ray imaging device according to an aspect of the present invention includes an X-ray generation unit, an X-ray detection unit facing the X-ray generation unit with a space therebetween, a support portion that supports the X-ray generation unit and the X-ray detection unit, a strut that stands upright from a placement face and holds the support portion, and a coupling portion that turnably couples the support portion to the strut.

The support portion may be bent so that both ends face each other to form bent portions, the X-ray generation unit and the X-ray detection unit may be disposed at both ends, and the coupling portion may rotate about a direction along the both ends.

The support portion may further include an expansion/contraction mechanism that is coupled to the coupling portion at the center in the length direction and that expands and contracts a distance between the center and the bent portion, and may turn the X-ray generation unit and the X-ray detection unit in an elliptical orbit.

The support portion may have an annular shape that is supported substantially parallel to the placement face and surrounds the space, and the support portion may slide on the coupling portion.

The coupling portion may have a hollow annular shape in which the X-ray generation unit and the X-ray detection unit are disposed, an annular rail may be laid in the coupling portion, and the support portion may hold the X-ray generation unit and the X-ray detection unit along an inner wall of the coupling portion, and fit to and slide on the rail.

The coupling portion may rotate the support portion by at least 180 degrees.

The support portion may have a partial annular shape that is supported substantially parallel to the placement face and surround part of the space, and swing around the space while sliding on the coupling portion.

The X-ray generation unit may continuously generate the X-ray while the support portion turns, and the X-ray detection unit may receive the X-ray to acquire the moving image including the plurality of X-ray images.

The X-ray generation unit may generate an X-ray while the support portion turns, and the X-ray detection unit may receive the X-ray to acquire a still image of the X-ray image.

The X-ray imaging device may further include an angle acquisition unit that acquires a rotation angle of the support portion and a storage unit that stores an X-ray image acquired by the X-ray detection unit and a rotation angle of the support portion when the X-ray image is acquired in association with each other.

A roller that supports the strut may be further provided on a lower face of the strut.

Advantageous Effects of Invention

According to the present invention, it is possible to acquire an X-ray image from multiple angles with a simple configuration.

BRIEF DESCRIPTION OF DRAWINGS

FIG. 2 is schematic diagrams illustrating states of an X-ray generation unit and an X-ray detection unit of the X-ray imaging device, in which

DESCRIPTION OF EMBODIMENTS

X-Ray Imaging Device (1)

Hereinafter, an embodiment of an X-ray imaging device according to the present invention will be described with reference to the drawings.

Figure 1:
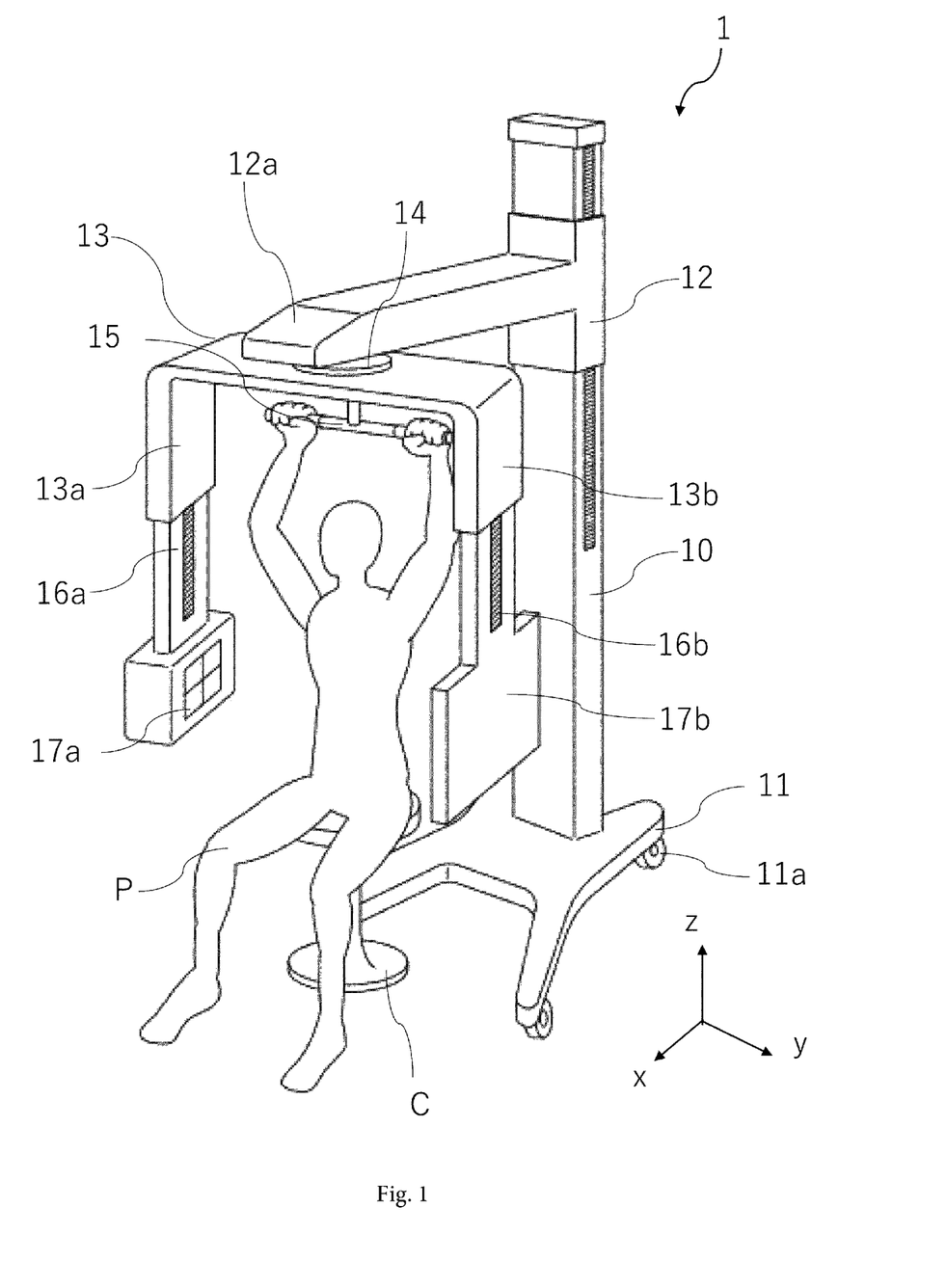
FIG. 1 is an overall schematic view illustrating the first embodiment of an X-ray imaging device according to the present invention.
Figures 2A, 2B:
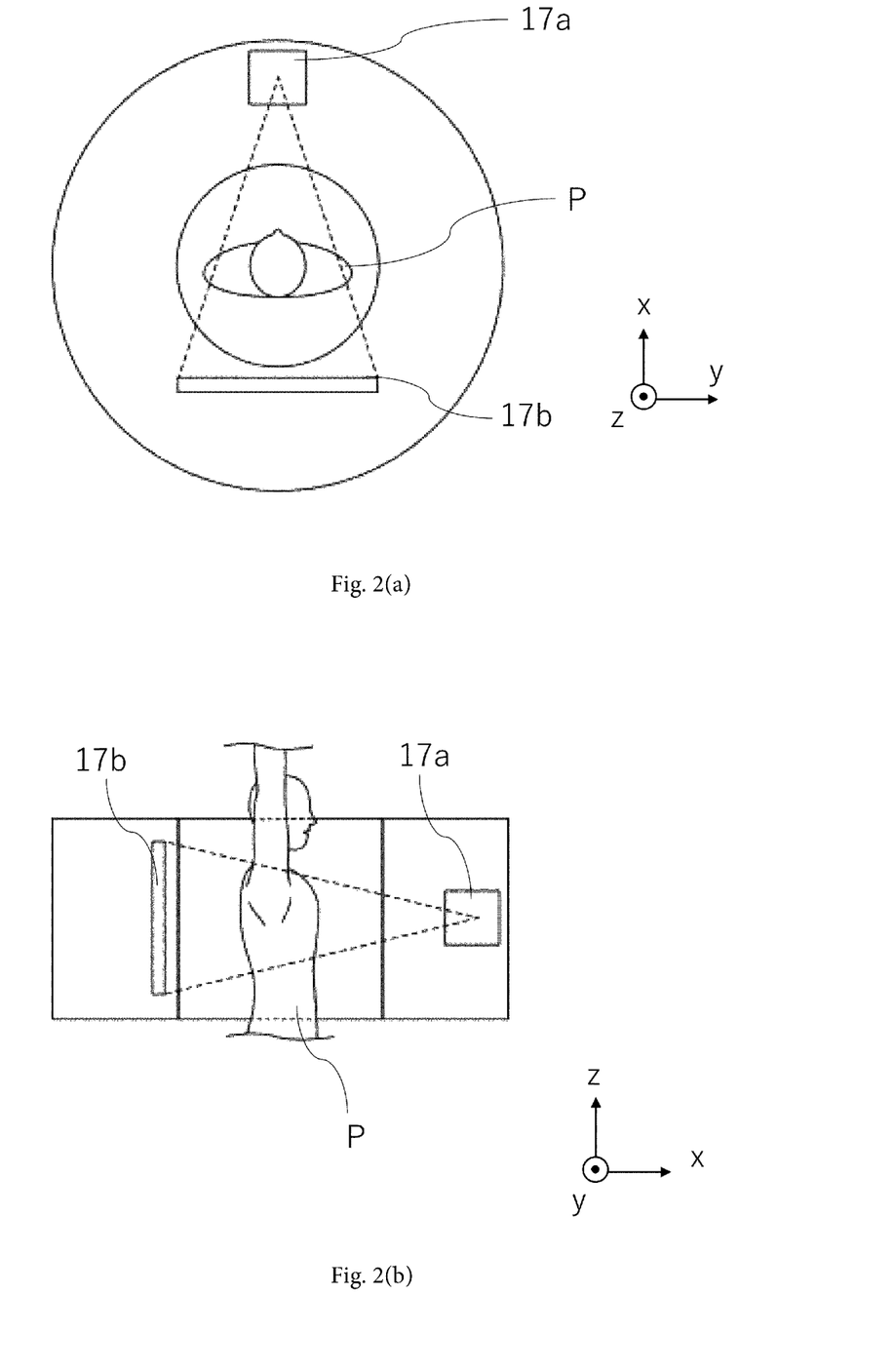
FIG. 2(a) is a schematic plan view and FIG. 2(b) is a schematic left side view.

As illustrated in FIGS. 1 and 2, an X-ray imaging device 1 is an device that captures an X-ray image while turning an X-ray generation unit 17a and an X-ray detection unit 17b around a patient P and acquires X-ray images of various parts of the body such as the head, the chest, and the abdomen of the patient P. Note that the figure illustrates a state in which the X-ray generation unit 17a and the X-ray detection unit 17b are adjusted to positions at which the chest is imaged. The X-ray imaging device 1 mainly includes a strut 10, a pedestal 11, an arm 12, a support portion 13, a coupling portion 14, a grip portion 15, the X-ray generation unit 17a, and the X-ray detection unit 17b. In the following description, a virtual plane in which the X-ray generation unit 17a and the X-ray detection unit 17b turn is defined as an x-y plane, and a vertically upward direction is defined as a z direction. In addition, a width direction of the patient at the time of imaging is defined as a y direction, and a direction to which the patient point is defined as a +x direction.

The X-ray generation unit 17a is a device that generates an X-ray that passes through the patient P. The X-ray detection unit 17b is a device that faces the X-ray generation unit 17a with a space and detects the X-ray, and is, for example, a panel type. The patient P sits on a chair C placed in the space, and a chest X-ray image is captured in the figure.

As illustrated in FIGS. 2(a) and 2(b), the X-ray generation unit 17a radially generates X-rays. The X-ray detection unit 17b has a light receiving region having an area equal to or larger than that of the X-ray generation unit 17a, and detects the radially-generated X-rays.

As illustrated in FIG. 1, the strut 10 is a column that stands upright from the floor serving as the placement face and holds each component of the X-ray imaging device 1 on the upper portion. The H-shaped pedestal 11 is disposed on the bottom face of the strut 10. A roller 11a is disposed at each end of the pedestal 11 and is movable on the floor. A groove is disposed in the length direction in the upper portion of the strut 10, and the groove fits to the arm 12.

The arm 12 is a member that is coupled to the strut 10 and mainly holds the X-ray generation unit 17a and the X-ray detection unit 17b above the patient P. The arm 12 fits to the groove of strut 10, and slides in the vertical direction along the groove to adjust the heights of the X-ray generation unit 17a and the X-ray detection unit 17b. The arm 12 may manually slide on the strut 10 or may electrically move up and down. Furthermore, the position of the arm 12 may be fixed by an appropriate lock mechanism. The arm 12 has a protruding portion 12a protruding forward (+x direction) from the strut 10, and the support portion 13 is coupled to a distal end portion of the protruding portion 12a.

The support portion 13 is a member that supports the X-ray generation unit 17a and the X-ray detection unit 17b. The support portion 13 is coupled to the coupling portion 14 at the center in the length direction. In the present embodiment, the support portion 13 is a member having a shape bent downward so that both ends 13a and 13b of the elongated flat plate face each other. A first slide portion 16a is coupled to a first end 13a of the support portion 13, a second slide portion 16b is coupled to a second end 13b, and the first slide portion 16a and the second slide portion 16b are slidable on both ends 13a and 13b, respectively. The X-ray generation unit 17a and the X-ray detection unit 17b are disposed at the distal ends of the first slide portion 16a and the second slide portion 16b, respectively, and the heights of the X-ray generation unit 17a and the X-ray detection unit 17b are adjusted by sliding the first slide portion 16a and the second slide portion 16b. The sliding mechanisms of the first slide portion 16a and the second slide portion 16b may be configured to operate manually or automatically. In addition, the first slide portion 16a and the second slide portion 16b may be coupled with each other by a pulley or the like, and when one is moved up and down, the other may move up and down with a similar stroke.

An expansion/contraction mechanism that expands and contracts the length may be provided between the rotation shaft of the support portion 13, that is, the coupling part with the coupling portion 14 and the bent portion bent downward, and may be configured to expand and contract according to the rotation of the support portion 13 to draw an elliptical orbit while causing the X-ray generation unit 17a and the X-ray detection unit 17b to face each other. The expansion/contraction mechanism includes, for example, a plurality of members that slide with each other, and electrically slides by a rack and pinion mechanism or the like. The expansion/contraction mechanism expands/contracts the support portion 13 in synchronization with the rotation of the support portion 13.

Specifically, in a state where the X-ray generation unit 17a and the X-ray detection unit 17b are orthogonal to the protruding portion 12a, the expansion/contraction mechanism shortens the distance between the X-ray generation unit 17a and the X-ray detection unit 17b. In a state where the X-ray generation unit 17a and the X-ray detection unit 17b are along the protruding portion 12a, the expansion/contraction mechanism extends the distance between the X-ray generation unit 17a and the X-ray detection unit 17b. Since the patient P is seated with the back facing the strut 10 and pointing to the protruding direction of the support portion 13, according to the above configuration, the distance between the X-ray generation unit 17a and the X-ray detection unit 17b is shortened when the X-ray generation unit a and the X-ray detection unit are located in front of and behind the patient P, respectively, and the distance between the X-ray generation unit and the X-ray detection unit is away when they are locate adjacent to the side of the patient P. That is, for example, the X-ray generation unit 17a and the X-ray detection unit 17b draw an elliptical orbit, and turn so that the minor axis of the ellipse corresponds to the front and back directions of the human body, and the major axis of the ellipse corresponds to the side direction.

Since the chest and abdomen of a person are generally elliptical when viewed from above, according to the above-described configuration, distances between the X-ray generation unit 17a and the X-ray detection unit 17b and the body surface of the patient P can be kept constant over the entire circumference.

When the X-ray (electromagnetic wave: photon) passes through an object containing a large amount of water such as a human body, the X-ray hardly reaches the X-ray detection unit 17b facing the X-ray generation unit 17a due to scattering of the X-ray and absorption of the X-ray into fat and organ, and affects the shadow of the X-ray image. Further, as the distance of the X-ray (electromagnetic wave: photon) increases, the X-ray is less likely to be transmitted. According to this configuration, since the distance from the body surface of the patient P to the X-ray generation unit 17a and the X-ray detection unit 17b is kept at the same distance, the transmittance of the X-ray by the distance is constant, and the captured moving image is easily uniformized. That is, the variables that affect the captured moving image include the distance to the subject, the X-ray intensity (X-ray tube voltage) that is the imaging condition of the X-ray imaging device, and the X-ray energy (X-ray tube current time product, that is, product of X-ray tube current and time). With this configuration, the distance is not required to be considered, and the X-ray captured moving image is easily uniformized.

The coupling portion 14 is a mechanism portion that rotatably couples the support portion 13 to the protruding portion 12a. The support portion 13 rotates about the coupling portion 14. The axis is an axis in a direction along both ends of the support portion 13, that is, a substantially vertical direction. The X-ray generation unit 17a and the X-ray detection unit 17b circle around the patient P according to the rotation of the coupling portion 14. The coupling portion 14 includes, for example, a motor, and is electrically automatically rotated by a rotation control unit to be described later.

The coupling portion 14 rotates the support portion 13 around the patient P by 360 degrees. According to this configuration, since the chest of the patient P can be imaged over the entire circumference, it is possible to image the detailed state of the organ such as the lung that cannot be captured only by the X-ray image from the front, such as the outer edge portion of the chest, the lower edge portion of the lung located near the diaphragm, and the deep site. In addition, even light inflammation such as a ground glass shadow can be easily found.

Since the X-ray image is captured by the X-ray being transmitted through the patient P, the X-ray images having the imaging angles different from each other by 180 degrees are partially bilaterally symmetric and are images corresponding to each other. Therefore, by rotating the X-ray generation unit 17a and the X-ray detection unit 17b at least 180 degrees around the patient P, the state of the region to be imaged can be observed over substantially the entire circumference. However, by radiating the X-ray from a position 180 degrees opposite, the X-ray can be transmitted through the internal tissue in a different order, and a different X-ray image can be acquired. That is, the X-ray generation unit 17a and the X-ray detection unit 17b are rotated by 360 degrees and imaging is performed, so that more detailed observation can be performed.

In the present embodiment, the coupling portion 14 is continuously rotatable. According to this configuration, imaging can be performed while circling without the preliminary operation. Consequently, the X-ray image having the same angle can be captured a plurality of times. In addition, even in a case where imaging is performed at a plurality of types of tube voltages by the imaging control unit 22 described later, imaging can be continuously performed without a preliminary operation.

The grip portion 15 is a rod-like member having an inverted T shape. The grip portion 15 is inserted into holes drilled in the support portion 13 and the coupling portion 14, and is suspended below the support portion 13. The grip portion 15 is coupled to the arm 12 and is not coupled to the support portion 13 and the coupling portion 14, and thus is stationary even during rotation of the support portion 13. The grip portion 15 is disposed above the patient P and is gripped by the patient P with both hands. When the patient P grips the grip portion 15, both hands are fixed above the chest or abdomen, so that both hands can be sufficiently away from the imaging region. The grip portion has any shape and is not limited to the inverted T shape.

Note that a replaceable thin film or the like may be attached to a portion in contact with the patient P, such as the grip portion 15 and the chair C. By replacing the film, the risk of infection between patients can be reduced.

Figure 3:
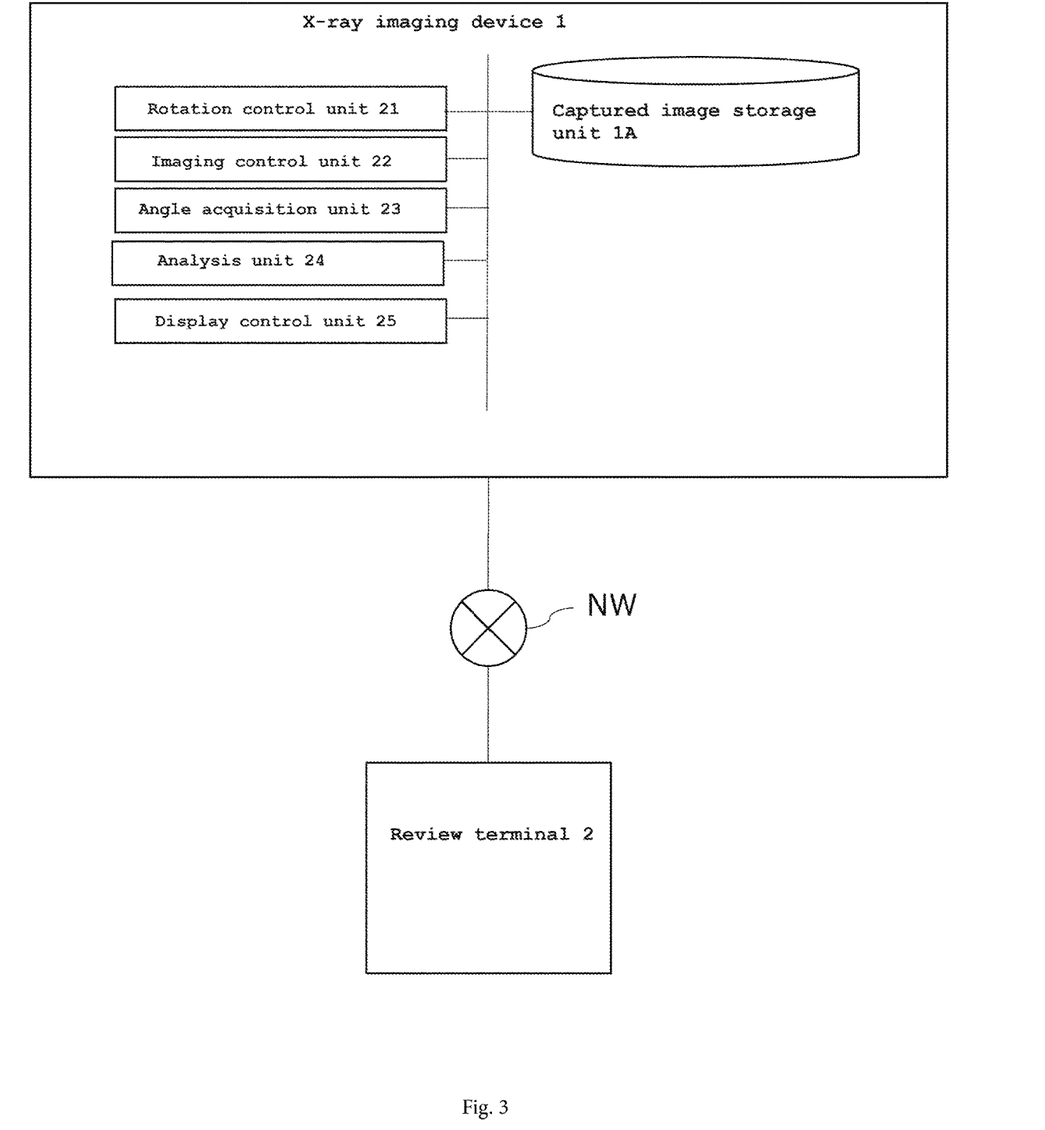
FIG. 3 is a schematic diagram illustrating a state of a functional block of the X-ray imaging device and a terminal to be connected.

Each functional block of the configuration of the X-ray imaging device 1 will be described in detail with reference to FIG. 3. As illustrated in the drawing, the X-ray imaging device 1 is achieved by an arithmetic device such as a central processing unit (CPU), a computer program executed by the CPU, and an internal memory such as a random access memory (RAM) and a read only memory (ROM). The X-ray imaging device 1 is thus constituted by functional blocks including a captured image storage unit 1A, a rotation control unit 21, a imaging control unit 22, an angle acquisition unit 23, an analysis unit 24, and a display control unit 25. Each electrical configuration may be configured to be powered by a battery included in the X-ray imaging device 1 in addition to being powered by various commercial power sources or power feeding devices.

The X-ray imaging device 1 is connected to a review terminal 2 through a network NW, and make it possible to review the captured image on the review terminal 2. The X-ray imaging device 1 is connected to picture archiving and communication systems (PACS), to transmit a captured image to the PACS. The PACS may receive an image captured by the X-ray imaging device 1 and store the image together with an image captured by another modality.

The rotation control unit 21 is a function unit that drives the coupling portion 14 and rotates the support portion 13. The rotation control unit 21 continuously rotates the support portion 13, but may intermittently repeat rotation and stop. The rotation control unit 21 may rotate the support portion 13 by 360 degrees, and may further rotate the support portion by a plurality of turns. Furthermore, it may rotate support portion in any rotation direction, and either or both of right rotation and left rotation may be possible. Furthermore, the rotation control unit 21 may perform so-called swing in which right rotation and left rotation are alternately performed.

The imaging control unit 22 drives the X-ray generation unit 17a and the X-ray detection unit 17b, and captures the X-ray image of the patient P seated between the X-ray generation unit 17a and the X-ray detection unit 17b. The imaging control unit 22 performs imaging while the support portion 13 is rotating. The imaging control unit 22 causes the X-ray generation unit 17a to continuously generate X-rays. The X-ray detection unit 17b receives the X-rays while switching the frame, and acquires the moving image including the plurality of X-ray images. According to the configuration in which imaging is performed while the X-ray generation unit 17a and the X-ray detection unit 17b are rotated, the X-ray images from multiple angles can be acquired with a simple configuration. In addition, according to the configuration in which imaging is performed by a flat panel detector (FPD) for a moving image, it is possible to smoothly observe the examination site of the patient P in the circumferential direction as if stereoscopically viewing the examination site by replaying the stereoscopic images as it is without combining the stereoscopic images. In addition, since each acquired image has a high resolution as in the X-ray image by still imaging, the image is clear even when enlarged as compared with a configuration in which synthesis processing or complement processing is performed, and highly reliable image diagnosis can be performed. Furthermore, since the synthesis processing and the complement processing are unnecessary, the image can be confirmed immediately after the imaging, and rapid diagnosis can be performed.

The imaging control unit 22 may cause the X-ray generation unit 17a to intermittently generate the X-rays.

Furthermore, the imaging control unit 22 may be capable of simply capturing an X-ray image of a still image instead of or in addition to capturing a moving image. At this time, the coupling portion 14 may be switchable between a mode of being manually rotated and a mode of being fixed at an any angle. Further, the rotation control unit 21 may receive an input of an angle from a predetermined user interface device, and may automatically turn the support portion 13 so that the angle of the support portion 13 is the input angle.

The imaging control unit 22 may have a function of generating an appropriate light beam for verifying the relative positions of the X-ray generation unit 17a and the X-ray detection unit 17b and checking the light receiving state. For example, the imaging control unit 22 generates a cross-shaped light beam from the X-ray generation unit 17a toward the X-ray detection unit 17b. The X-ray detection unit 17b detects the light beam, and determines whether the center of the cross is detected at the center of the detection region of the X-ray detection unit 17b. With this configuration, it is possible to calibrate whether the reference of the X-ray generation unit 17a and the X-ray detection unit 17b is matched. The light beam may be an X-ray or an electromagnetic wave having a different wavelength, for example, visible light.

The angle acquisition unit 23 is a function unit that acquires the rotation angle of the support portion 13. The angle acquisition unit 23 records the rotation angle when the X-ray image is captured for each X-ray image captured by the imaging control unit 22. The angle acquisition unit 23 periodically acquires the angle of the support portion 13 by, for example, an angle meter driven with a clock synchronized with the frame rate of the moving image of the X-ray.

The captured image storage unit 1A is a function unit that stores each image included in the captured moving image and the captured rotation angle in association with each other. In addition, the captured image storage unit 1A may store information about the patient, such as the age, sex, height, and weight of the patient, and store the information in association with the captured image. The captured image may be temporarily stored in the captured image storage unit 1A and transmitted to the PACS at an appropriate timing.

The analysis unit 24 is a function unit that analyzes the acquired X-ray image. For example, the analysis unit 24 may create a three-dimensional image by combining the acquired images.

The display control unit 25 is a function unit that causes the review terminal 2 to display the acquired X-ray image or the image generated by the analysis. The review terminal 2 is a terminal reviewed by a medical professional, and is, for example, a personal computer. Further, the review terminal 2 may be a tablet terminal or a smartphone. The review terminal 2 may be connected in a wired or wireless manner in addition to the network NW. The display control unit 25 may display the image on a display unit included in the X-ray imaging device 1.

The display control unit 25 displays the plurality of acquired X-ray images in order of the rotation angle of the support portion 13. The display control unit 25 may automatically switch and display the X-ray images and replay the X-ray images as an X-ray moving image showing turning around the patient P. According to this configuration, the inside of the body of the patient P can be stereoscopically grasped by the X-ray moving image, and even a light ground glass shadow or inflammation of the outer edge portion can be easily found. The X-ray moving image may be replayed at a frame rate similar to that at the time of imaging, or the replay speed may be variable.

In addition, the display control unit 25 may receive an operation from the review terminal 2 and manually switch the X-ray image to be displayed. For example, a seek bar and a slider may be displayed on the display of the review terminal 2, and the designation of the replay start position of the display image or the moving image may be received by a mouse, a keyboard, or a touch operation.

X-Ray Imaging Device (2)

Figure 4:
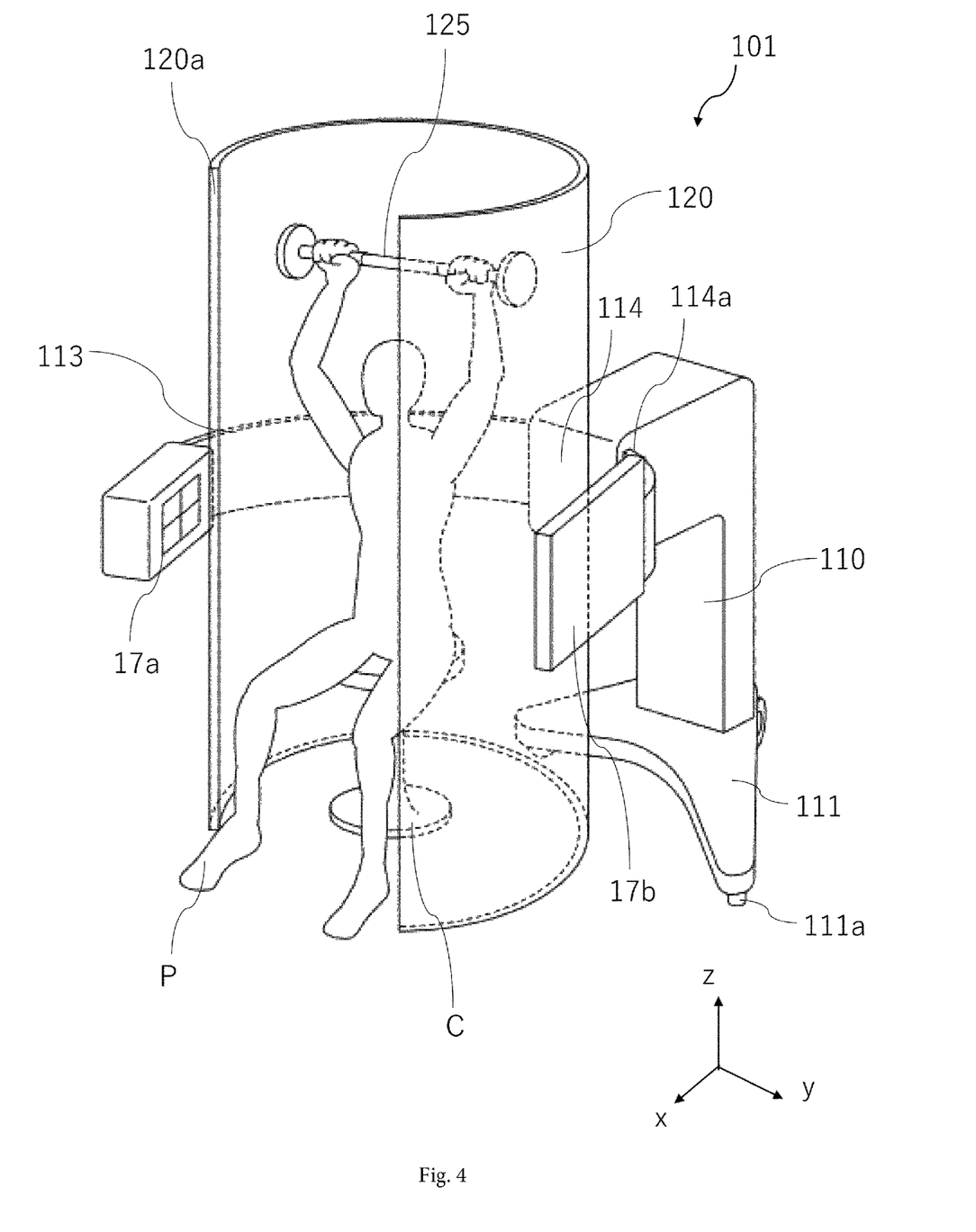
FIG. 4 is an overall schematic view illustrating the second embodiment of an X-ray imaging device according to the present invention.

With reference to FIG. 4, the second embodiment of an X-ray imaging device according to the present invention will be described focusing on a configuration different from that of the first embodiment. The X-ray imaging device of the second embodiment is different from that of the first embodiment in that the support portion slides on the coupling portion at a side of a patient. In the following description of each embodiment, components same as those of the other embodiments are denoted by the same reference numerals.

As illustrated in FIG. 4, an X-ray imaging device 101 mainly includes the X-ray generation unit 17a, the X-ray detection unit 17b, a strut 110, a pedestal 111, a support portion 113, and a coupling portion 114.

The strut 110 is fixed to the pedestal 111 having a substantially L-shape at a lower end. A plurality of rollers 111a is coupled to the pedestal 111, which is movable on a floor on which the pedestal is placed. The diameter of the roller 111a coupled to the center portion of the pedestal 111 may be larger than the diameter of the rollers 111a coupled to the ends of the pedestal 111.

An upper portion of the strut 110 protrudes forward (+x direction), and this protruding end is the coupling portion 114 coupled to the support portion 113. The coupling portion 114 of the present embodiment has a through hole 114a, drilled in the y direction, through which the support portion 113 is inserted and which holds part of the support portion 113. Note that, instead of this configuration, the coupling portion 114 may sandwich the upper and lower edge portions so as to cover the outer peripheral face of the support portion 113. In addition, the coupling portion 114 may have a gear protruding toward the support portion 113 and may mesh with a long and narrow recess formed along the length direction in the support portion 113. When the gear of the coupling portion 114 rotates, the gear and the recess of the support portion 113 forms a rack-and-pinion mechanism, and the support portion 113 moves with respect to the coupling portion.

The support portion 113 is a partially annular member that is supported substantially parallel to the placement face and holds the X-ray generation unit 17a and the X-ray detection unit 17b at both ends. The support portion 113 surrounds part of the space between the X-ray generation unit 17a and the X-ray detection unit 17b. A center portion of the support portion 113 is inserted into the through hole 114a of the coupling portion 114. In addition, a rotation mechanism is provided on the inner wall of the through hole 114a, the rotation mechanism and the outer wall of the support portion 113 contact each other, and the support portion 113 is fed according to the electric rotation of the rotation mechanism. The rotation mechanism is, for example, a pulley, and may transmit rotation by fitting to teeth provided on the outer wall. In addition, the rotation mechanism may be configured by a motor and a pressing member, having a large coefficient of friction, that rotates together with the motor, and the pressing member may rotate while being pressed against the outer wall of the support portion 113 to turn the support portion 113 by a frictional force. The support portion 113 and coupling portion 114 may fit with each other by an appropriate rail that may guide the support portion 113 so that it does not incline. With the appropriate configuration as described above, the support portion 113 swings around the space between the X-ray generation unit 17a and the X-ray detection unit 17b. According to this configuration, the X-ray image of the patient P can be captured over a range of about 180 degrees.

The support portion 113 may include the first member having the elliptical partial annular shape and the second member sliding on the first member, and the X-ray generation unit 17a and the X-ray detection unit 17b may be coupled to the second member. In this configuration, the first member is fixed to the strut 110, and the second member defines the distance between the X-ray generation unit 17a and the X-ray detection unit 17b, and slides along the first member in a curve line. According to this configuration, the X-ray generation unit 17a and the X-ray detection unit 17b draw an elliptical orbit while facing each other, and can perform imaging while maintaining a constant distance along the substantially elliptical body surface of the patient P. Such a configuration can be similarly applied to other embodiments described below.

In the present embodiment, a partition 120 that partitions a space between the X-ray generation unit 17a and the X-ray detection unit 17b is disposed. The partition 120 is partially cylindrical, and the patient P can enter and leave the space from a gap 120a of the partition 120. The gap 120a is provided, for example, on a side wall, of the partition 120, opposite to the X-ray imaging device 101. The partition 120 may be constructed with one member, or may be assembled or coupled.

In an upper portion of the partition 120, a rod-like grip portion 125 is laterally bridged on opposing inner walls. The grip portion 125 is located above the patient P seated on the chair C in the space, and the patient P is in a posture in which the patient raises both hands upward by gripping the grip portion 125. According to this configuration, it is possible to guide both hands of the patient P upward and exclude them from the imaging region of the abdomen or chest X-ray image.

X-Ray Imaging Device (3)

Figure 5:
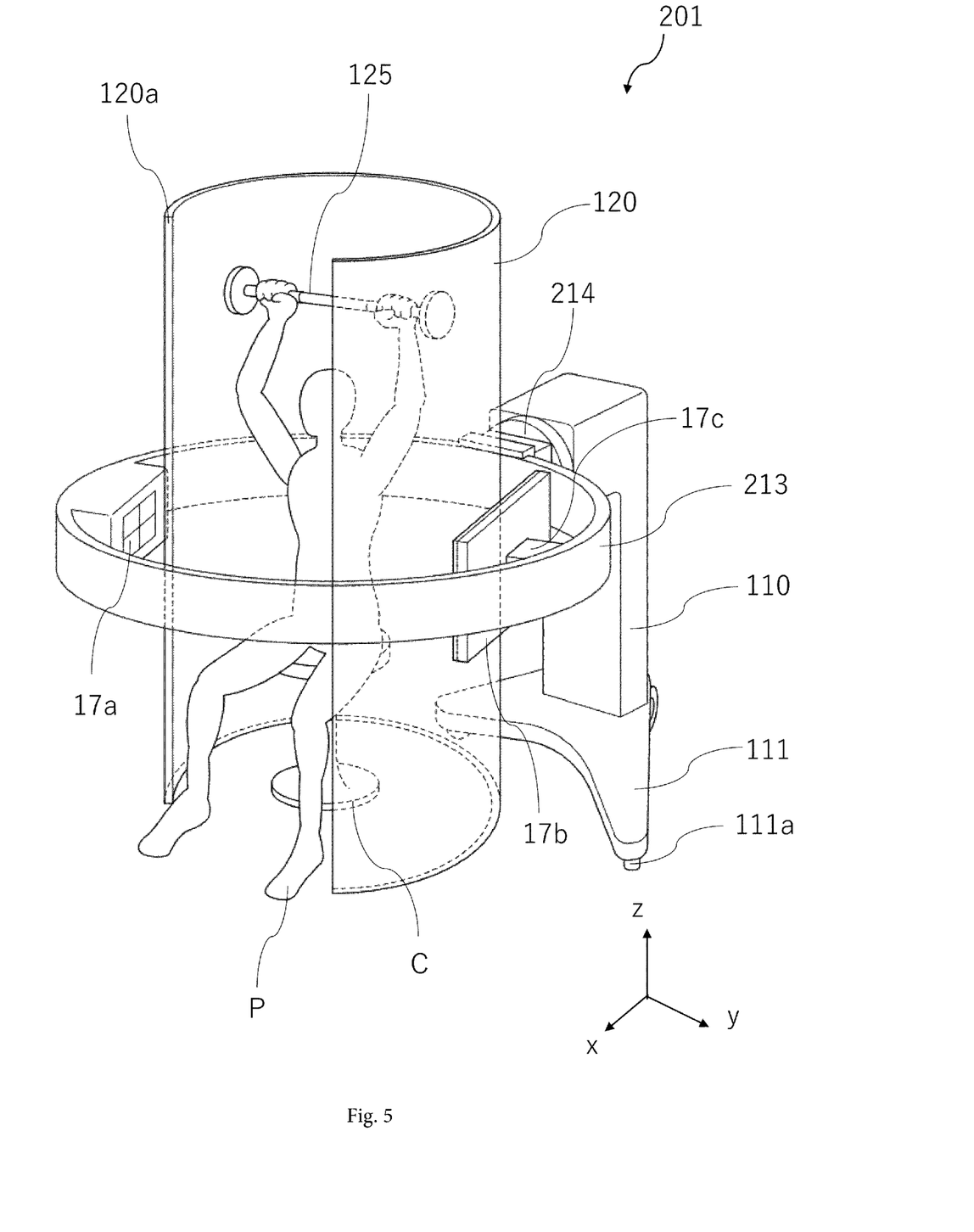
FIG. 5 is an overall schematic view illustrating the third embodiment of an X-ray imaging device according to the present invention.

With reference to FIG. 5, the third embodiment of an X-ray imaging device according to the present invention will be described focusing on a configuration different from that of the second embodiment. The X-ray imaging device of the third embodiment is different from the configuration described above in that the support portion has an annular shape, and a space in which the patient is seated is formed inside the annular shape.

As illustrated in FIG. 5, an X-ray imaging device 201 includes an annular support portion 213. On the inner periphery of the support portion 213, the X-ray generation unit 17a and the X-ray detection unit 17b are disposed to face each other. In the present embodiment, the X-ray detection unit 17b is coupled to a support body 17c protruding from the support portion 213. The strut 110 is bent forward in the +x-axis direction at a distal end, and a coupling portion 214 with the support portion 213 is disposed at the distal end. The coupling portion 214 in the present embodiment is a substantially U-shaped member that grips the outer periphery of the support portion 213. The center portion of the coupling portion 214 contacts the outer peripheral face of the support portion 213, and for example, the support portion 213 is turned by an appropriate mechanism as described in the configuration of the second embodiment. According to the configuration of the third embodiment, the support portion 213 is rotated by 360 degrees along the coupling portion 214, and the X-ray image of the patient can be acquired over the entire circumference.

X-Ray Imaging Device (4)

Figure 6:
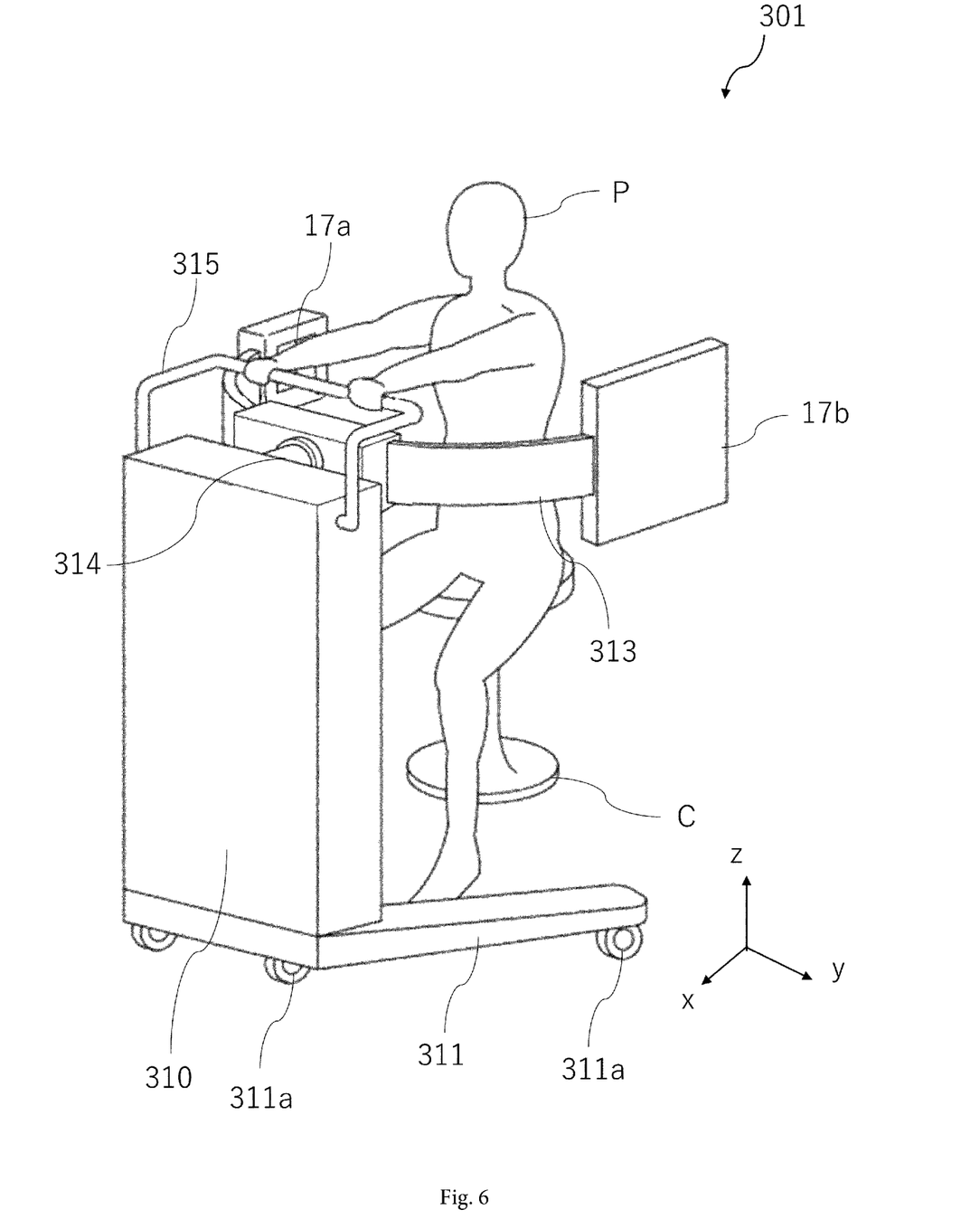
FIG. 6 is an overall schematic view illustrating the fourth embodiment of an X-ray imaging device according to the present invention.

With reference to FIG. 6, the fourth embodiment of an X-ray imaging device according to the present invention will be described focusing on a configuration different from configurations of the previous embodiments. An X-ray imaging device 301 of the fourth embodiment is different from the previously described embodiments in that a grip portion 325 is disposed on the upper portion of a strut 310 and is disposed in front of the patient P to perform imaging.

As illustrated in FIG. 6, the X-ray imaging device 301 mainly includes the X-ray generation unit 17a, the X-ray detection unit 17b, the strut 310, a base 311, a support portion 313, a coupling portion 314, and a grip portion 315.

The strut 310 is a columnar member standing upright from above the floor, and is connected to the base 311 at the lower end. The strut 310 is fixed to the center portion of the base 311, and both ends slightly radially extend from the center portion toward the rear in the drawing. A plurality of rollers 311a is coupled to the lower face of the base 311, which is movable on the floor.

The support portion 313 is a partially annular member that supports the X-ray generation unit 17a and the X-ray detection unit 17b at both ends. The support portion 313 surrounds part of the space between the X-ray generation unit 17a and the X-ray detection unit 17b, and swings around the space by driving the mechanism inside the coupling portion 314.

The coupling portion 314 that connects the support portion 313 and the strut 310 is disposed on the upper back face of the strut 310. The coupling portion 314 includes a substantially cylindrical column extending in the −x direction toward the space between the X-ray generation unit 17a and the X-ray detection unit 17b, and a housing coupled to the support portion 313. The housing may have an insertion hole through which the support portion 313 is inserted, or may hold the upper and lower edge portions so as to cover the outer peripheral face of the support portion 313. The coupling portion 314 turns the support portion 313 by, for example, an appropriate mechanism as described in the configuration of the second embodiment.

The grip portion 315 is a rod-like member disposed above strut 310. The grip portion 315 is coupled to the side faces of the strut 310 at both ends, and is placed in front of the patient P. When the patient P grips the grip portion 315 with both hands, the both hands are away from the chest or the abdomen, so that the chest X-ray imaging is not hindered.

The X-ray imaging device 301 of the fourth embodiment is more compact in the height direction than the X-ray imaging device 1 of the first embodiment, it is easier to convey the device.

X-Ray Imaging Device (5)

Figure 7:
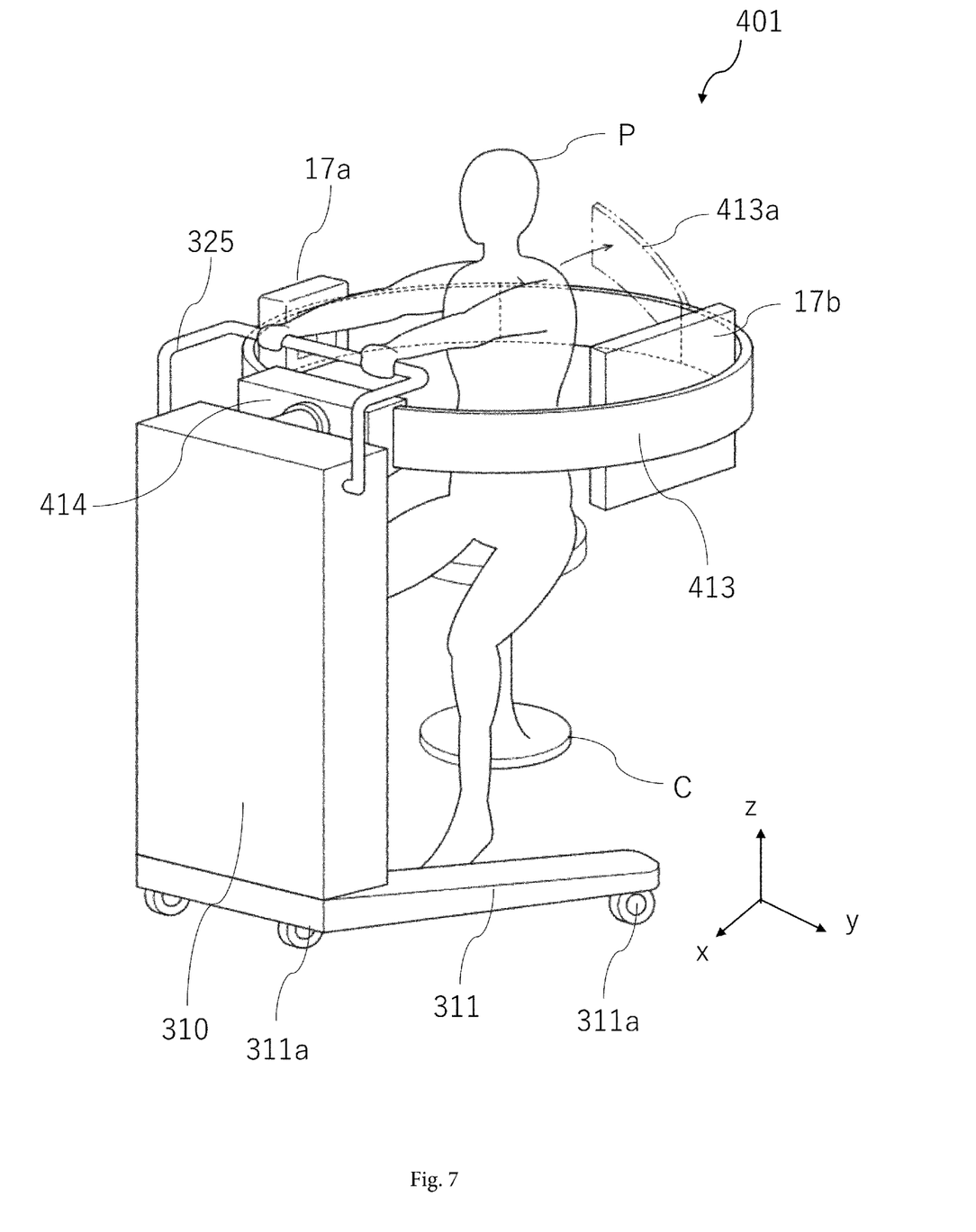
FIG. 7 is an overall schematic view illustrating the fifth embodiment of an X-ray imaging device according to the present invention.

With reference to FIG. 7, the fifth embodiment of an X-ray imaging device according to the present invention will be described focusing on a configuration different from configurations of the previous embodiments. An X-ray imaging device 401 of the fifth embodiment has a configuration in which the support portion 313 of the fourth embodiment has an annular shape.

A support portion 413 in the present embodiment is an annular member, and a coupling portion 414 sandwiches the upper and lower edge portions so as to cover the outer peripheral face of the support portion 413. When the support portion 413 slides on the coupling portion 414, the support portion 413 goes around the patient P. The support portion 413 has a door 413a that opens and closes at one end connected by a hinge. According to this configuration, the patient P can easily enter and exit the space where the X-ray imaging is performed. Note that the shape of the door 413a is not limited to this, and may be any shape such as a sliding door type by a rail, an assembling type, or a fitting type in which part of the support portion 413 is a separate body and is detachable.

As described above, the X-ray imaging device according to the present invention can acquire the X-ray image from multiple angles with a simple configuration. By imaging from multiple angles, even light inflammation such as a ground glass shadow can be easily found. In addition, since the X-ray imaging device is small, self-standing, and movable by the roller, the X-ray imaging device is excellent in transportability, and can perform the X-ray imaging at an any place. The X-ray imaging device has a size that can be carried into a welfare-modified vehicle, for example. Therefore, even in a case where the patient is suspected of having an infectious disease, it is possible to perform imaging without letting the patient visit a medical institution or a medical facility.

X-Ray Imaging Device (6)

Figure 8:
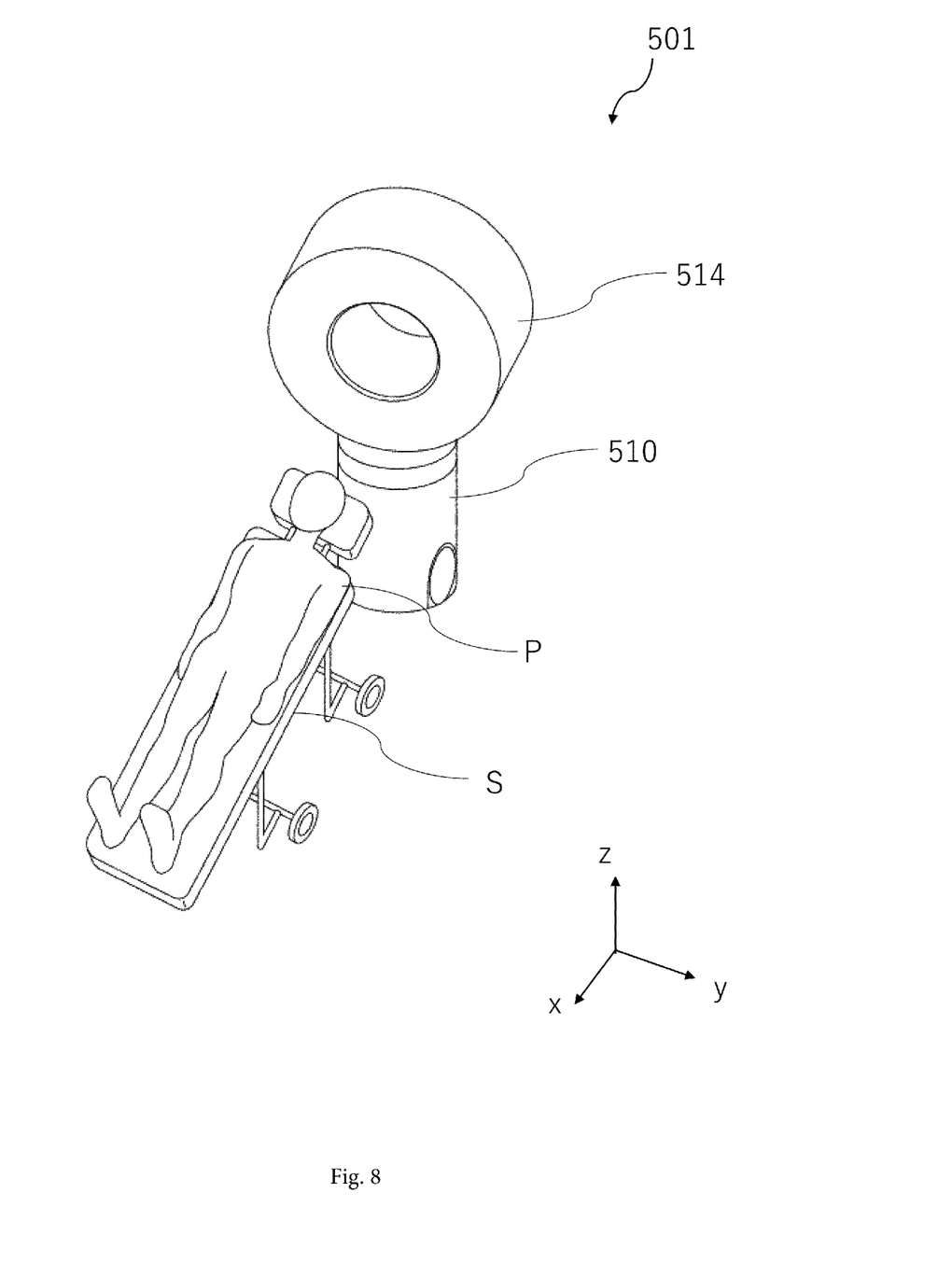
FIG. 8 is an overall schematic view illustrating the sixth embodiment of an X-ray imaging device according to the present invention.
Figure 9A:
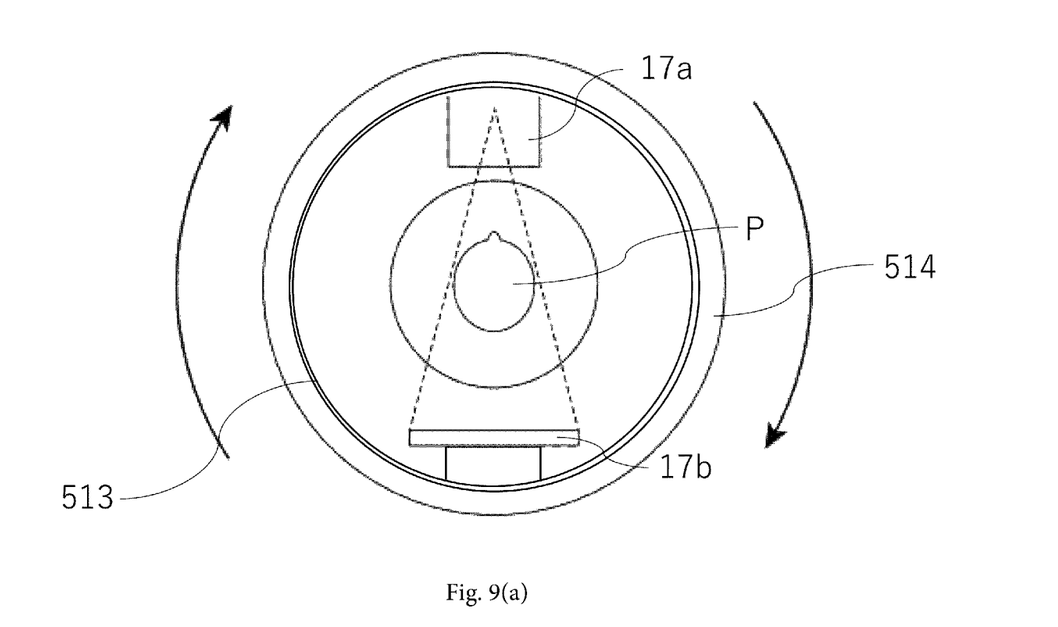
FIG. 9(a) is a schematic rear view of the X-ray imaging device.
Figure 9B:
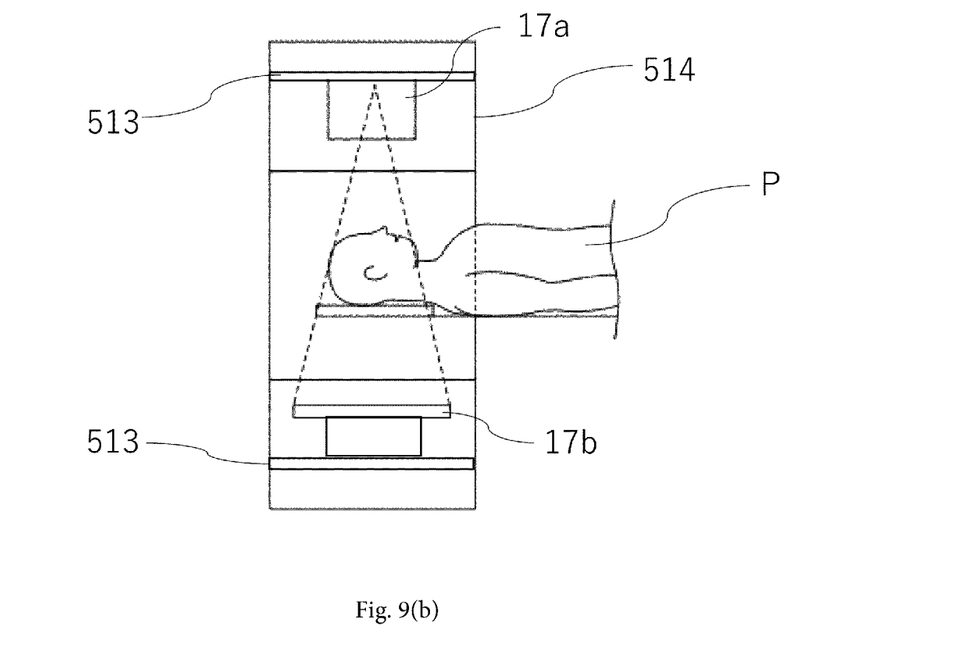
FIG. 9(b) is a schematic left side view of the X-ray imaging device.

With reference to FIGS. 8 and 9, the sixth embodiment of an X-ray imaging device according to the present invention will be described focusing on a configuration different from configurations of the previous embodiments. In the X-ray imaging device of the sixth embodiment, the hollow annular coupling portion covers the X-ray generation unit and the X-ray detection unit, and the X-ray generation unit and the X-ray detection unit turn in the support portion.

An X-ray imaging device 501 has a strut 510 and a coupling portion 514 in appearance. The strut 510 is placed on the floor and supports the coupling portion 514. An upper end of the strut 510 is coupled to an outer face of the coupling portion 514. Although not shown in the drawing, a roller for supporting the strut 510 may be provided on the lower face of the strut 510.

The coupling portion 514 has a hollow annular shape, and the axis of the coupling portion 514 is substantially orthogonal to the length direction of the strut 510. In the present embodiment, an X-ray image of the head of the patient P is captured by inserting the head into the annular ring of the coupling portion 514. The patient P is, for example, in a supine position on a stretcher S with a roller, and the photographer, the assistant, or the like transfers the head of the patient P together with the stretcher S to the annular inside of the coupling portion 514.

As illustrated in FIGS. 9(a) and 9(b), the X-ray generation unit 17a, the X-ray detection unit 17b, and a support portion 513 are disposed inside the coupling portion 514. The support portion 513 is a member that holds the X-ray generation unit 17a and the X-ray detection unit 17b along the inner wall of the coupling portion 514, and is, for example, an annular or semi-annular member. An annular rail to fit to the support portion 513 is laid on an inner wall of the coupling portion 514, for example, an inner wall of the outer face, and the support portion 513 is slidable along the rail. For example, the support portion 513 includes an appropriate motor and turns on the rail of the coupling portion 514. Also in the embodiment, it is possible to include the angle acquisition unit that acquires the rotation angle of the support portion 513 with respect to the coupling portion 514, and store the X-ray image acquired by the X-ray detection unit 17b and the rotation angle of the support portion when the X-ray image is acquired in the captured image storage unit 1A in association with each other.

According to such a configuration, the X-ray image of the head can be captured over the entire circumference.

In the present description, the medical X-ray imaging device that images a patient is described as an example, but the technical scope of the present invention is not limited thereto, and can also be used for various non-destructive inspections.

REFERENCE SIGNS LIST

1 X-ray imaging device
10 strut
13 support portion
14 coupling portion
15 grip portion
17a X-ray generation unit
17b X-ray detection unit
21 rotation control unit
22 imaging control unit
23 angle acquisition unit
24 analysis unit
25 display control unit

The invention claimed is:

1. An X-ray imaging device that acquires an X-ray image of at least a chest of a patient, the X-ray imaging device comprising:
an X-ray generation unit;
an X-ray detection unit facing the X-ray generation unit with a space therebetween;
a support portion that supports the X-ray generation unit and the X-ray detection unit;
a strut that stands upright from a placement face and holds the support portion;
a coupling portion that turnably couples the support portion to the strut;
an arm that extends from the strut toward above the patient and that suspends and holds the support portion and the coupling portion above the patient; and
a grip portion coupled to the arm, inserted through a hole formed in each of the support portion and the coupling portion, and suspended below the support portion, wherein
both ends of the support portion are bent so as to face each other, the X-ray generation unit and the X-ray detection unit are disposed at the both ends, and the X-ray generation unit and the X-ray detection unit face each other with a space where at least a human body of the patient is placed, wherein the coupling portion turns about a direction along the both ends, and the X-ray generation unit and the X-ray detection unit circle around the patient, and wherein the X-ray generation unit generates an X-ray continuously while the support portion turns, and the X-ray detection unit receives the X-ray and acquires a moving image including a plurality of X-ray images.

2. The X-ray imaging device according to claim 1, wherein a first slide portion and a second slide portion are coupled to the both respective ends of the support portion, and the first slide portion and the second slide portion are provided with the X-ray generation unit and the X-ray detection unit, respectively, and are slidable on the both respective ends.

3. The X-ray imaging device according to claim 1, wherein the arm slides on the strut in a vertical direction.

4. The X-ray imaging device according to claim 1, wherein the support portion further includes an expansion/contraction mechanism that is coupled to the coupling portion at a center in a length direction and that expands and contracts a distance between the center and the X-ray generation unit or the X-ray detection unit, and turns the X-ray generation unit and the X-ray detection unit in an elliptical orbit.

5. The X-ray imaging device according to claim 1, wherein the coupling portion rotates the support portion by at least 180 degrees.

6. The X-ray imaging device according to claim 1, wherein the X-ray generation unit generates an X-ray while the support portion turns, and the X-ray detection unit receives the X-ray to acquire a still image of an X-ray image.

7. The X-ray imaging device according to claim 1, further comprising:

an angle acquisition unit that acquires a rotation angle of the support portion; and a storage unit that stores an X-ray image acquired by the X-ray detection unit and a rotation angle of the support portion when the X-ray image is acquired in association with each other.

8. The X-ray imaging device according to claim 1, further comprising:

a roller that supports the strut on a lower face of the strut.

9. The X-ray imaging device according to claim 1, wherein the X-ray detection unit receives the X-ray by a flat panel detector for a moving image.

* * * * *